(12) United States Patent
Au et al.

(10) Patent No.: US 8,893,014 B1
(45) Date of Patent: Nov. 18, 2014

(54) DEFERRED LOADING OF A WEB PAGE

(75) Inventors: Carolyn F. Au, Mountain View, CA (US); Justin J. Tansuwan, Mountain View, CA (US); Venkat Venugopalan, Mountain View, CA (US); Ryoji Watanabe, Cupertino, CA (US)

(73) Assignee: Google Inc., Mountain View, CA (US)

( * ) Notice: Subject to any disclaimer, the term of this patent is extended or adjusted under 35 U.S.C. 154(b) by 188 days.

(21) Appl. No.: 13/536,950

(22) Filed: Jun. 28, 2012

(51) Int. Cl.
*G06F 17/30* (2006.01)

(52) U.S. Cl.
USPC ............ 715/745; 715/234; 715/738; 715/744

(58) Field of Classification Search
CPC .......... G06F 17/3089; G06F 17/30899; G06F 17/30994; G06F 17/30
USPC .................. 715/813, 231, 234, 738, 744, 745
See application file for complete search history.

(56) References Cited

U.S. PATENT DOCUMENTS 7,286,997 B2 * 10/2007 Spector et al. .................... 705/2
2012/0110480 A1 * 5/2012 Kravets ......................... 715/760

* cited by examiner

*Primary Examiner* — Alvin Tan
*Assistant Examiner* — Charity Sibal
(74) *Attorney, Agent, or Firm* — Patent Law Works LLP

(57) ABSTRACT

A system and method for deferring the loading of user interface (UI) components of a web page. A processing module receives data describing user activities and generates user behavior data for a user in a social network. A component engine generates the data for loading different UI components of the web page. A user behavior module receives the user behavior data and determines an order in which each UI component of the web page is loaded. A loading engine transmits data to a user's browser for loading a static version of the web page and then loads the different UI components according to the order.

20 Claims, 6 Drawing Sheets

DEFERRED LOADING OF A WEB PAGE

The specification relates to a system and method for determining a loading of components of a web page. In particular, the specification relates to loading different user interface components of a web page based on static content and user behavior.

BACKGROUND

As the Internet grows, users expect web pages to load quickly and to provide instance access to content. This is difficult when web pages include multiple HTTP requests for downloading all the components including images, stylesheets, scripts, Flash, etc. Current techniques for reducing the content load include loading only a small portion of a web page that is different from a previously loaded web page, reducing the number of components on the web page or avoiding the execution of external scripts during loading to save loading latency. However, such techniques are not always effective and the changes often result in a less desirable web page. What is needed is a method that not only helps save the loading latency for loading a web page but also customizes the loading for an individual user who requests a web page.

SUMMARY

In some examples the specification describes a system and method for deferring the loading of user interface components (referred hereafter as "UI components") of a web page. A processing module receives data describing user activities and generates user behavior data for a user in a social network. A component engine generates the data for loading different UI components of the web page. A user behavior module receives the user behavior data and determines an order in which each UI component of the web page is loaded. A loading engine transmits data to a user's browser for loading a static version of the web page and then loads the different UI components according to the order.

In one embodiment, the specification describes a computer-implemented method for determining a loading of a web page comprising receiving, using the one or more computing devices, a first call from a browser for loading a first and a second user interface component of the web page, determining, using one or more computing devices, a user in a social network based on the first call, receiving, using the one or more computing devices, user behavior data associated with the user, the user behavior data including a frequency of the user interacting with each user interface component, determining, using the one or more computing devices, a higher priority for loading the first user interface component than the second user interface component based at least in part on the received user behavior data associated with the user and transmitting, using the one or more computing devices, data for loading the first user interface component before transmitting data for loading the second user interface component.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION OF THE PREFERRED EMBODIMENTS

Overview

Figure 1:
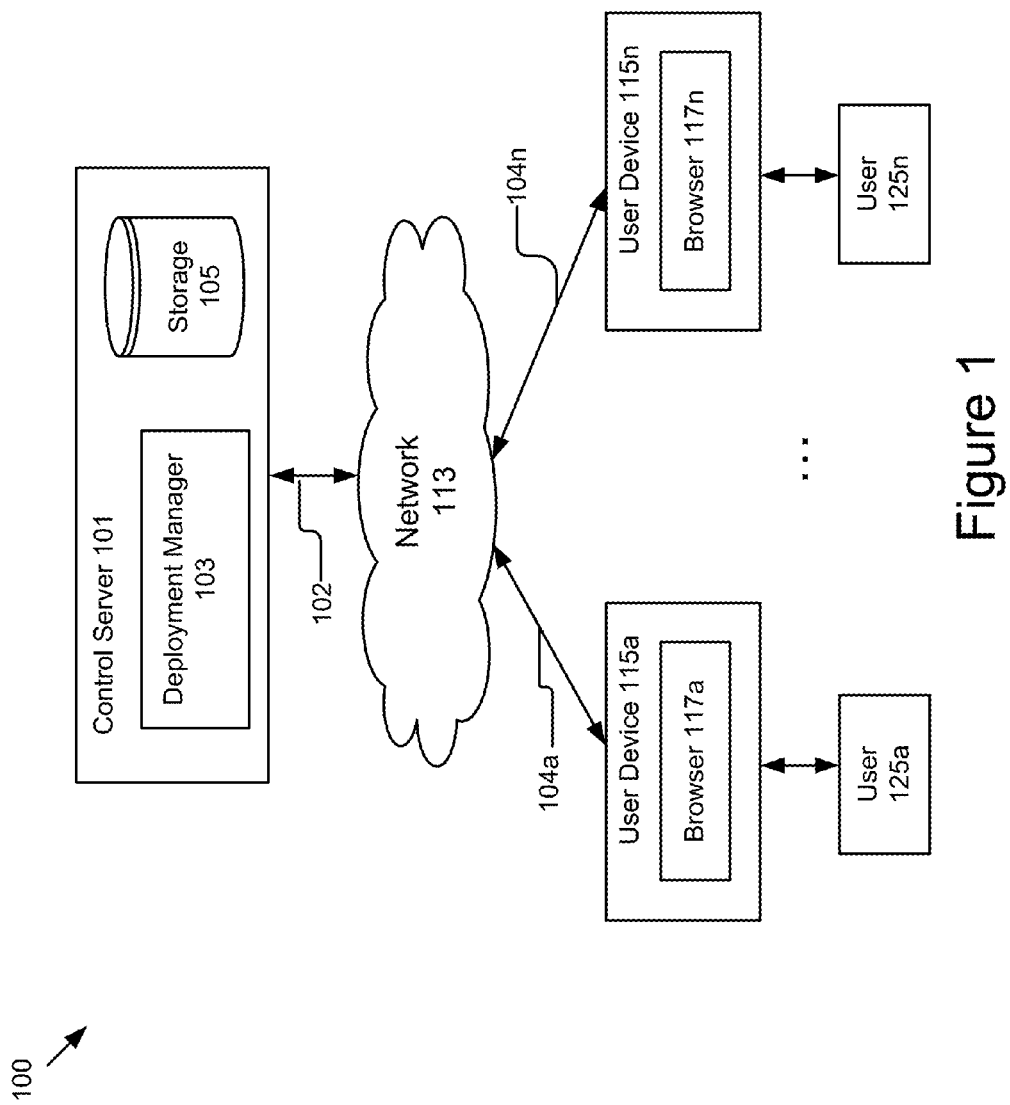
FIG. 1 is a high-level block diagram illustrating one embodiment of a system for deferring the loading of components of a web page.

Embodiments herein relate to deferred loading of components of a web page. In particular, embodiments involve loading different UI components of the web page depending upon a user's browsing behavior. A webpage in the browser includes (1) inline content on the base HyperText Markup Language (HTML) page; and (2) resources referenced in the base HTML page that are fetched additionally. The base HTML page can include multiple types of programming languages, such as Cascading Style Sheet (CSS), HTML and inline JavaScript. The additional resources can include images and deferred JavaScript files. In one embodiment, a deployment manager serves the content for the web page in three stages: (1) serving of the base HTML page entities; (2) serving of the images; and (3) serving of deferred JavaScript files.

In one embodiment, a deployment manager includes a component engine, a user behavior module and a loading engine. The component engine generates the data for loading the different UI components. The user behavior module receives user behavior data and determines an order in which each UI component should be loaded. The loading engine transmits data to a user's browser for loading a static version of the web page from a cache and transmits instructions for loading different UI components in response to receiving a call from the browser. For example, when generating a user profile page for a user in a social network, the loading engine instructs the browser to first load UI components that include the user's personal data such as a notification component that indicates a number of notifications for the user. Next, the browser loads UI components that are less frequently accessed by the user.

For example, a first user and a second user want to view a web page of an online store. The first user is a customer who always searches products in a merchandise list on the web page. Based on the user behavior of the first user, the user behavior module 205 determines a high priority for loading the merchandise list when the web page of the online store is loaded for the first user. The second user is a vendor who sells products on the online store. Rather than checking the merchandise list, the second user more frequently checks the statistical information about inventory or product selling such as a number of a specific products that were sold, top-selling products, sold-out products, etc. In this case, the user behavior module 205 determines that an icon showing the statistical information should be loaded before the merchandise list when the web page of the online store is loaded for the second user.

In one embodiment, the user behavior module determines the order for loading UI components based on a frequency that a user interacts with the UI components on the web page and determines a priority for loading the UI components based at least in part on the frequency. If the user frequently interacts with a UI component, the user behavior module determines a higher priority for loading that UI component than UI components that are less frequently accessed. In another embodiment, the user behavior module also determines a priority for loading UI components based on experimental running conditions.

Example Systems

FIG. 1 illustrates a block diagram of a system 100 for deferring the loading of components of a web page according to one embodiment. The illustrated system 100 for deferring the loading of components of the web page includes user devices 115a . . . 115n that are accessed by users 125a . . . 125n and a control server 101. In the illustrated embodiment, these entities are communicatively coupled via a network 113. In FIG. 1 and the remaining figures, a letter after a reference number, for example, "115a" is a reference to the element having that particular reference number. A reference number in the text without a following letter, for example, "115" is a general reference to any or all instances of the element bearing that reference number. Although only two devices are illustrated, persons of ordinary skill in the art will recognize that any number of user devices 115n is available to any number of users 125n.

The control server 101 may be a hardware server device. The control server 101 is communicatively coupled to the network 113 via signal line 102. In one embodiment, the control server 101 comprises, among other things, a deployment manager 103 and a storage device 105.

The deployment manager 103 is code and routines for determining how to load a web page for a user 125a . . . 125n. For example, when generating a user profile page for a user in a social network, the deployment manager 103 first transmits data for displaying UI components that include the user's personal data such as a notification component that indicates a number of notifications for the user. In one embodiment, the deployment manager 103 determines a priority for instructing the browser to load each UI component based on user behavior data associated with a user, in particular, a frequency that the user interacts with a UI component on the web page. If the user frequently interacts with a UI component, the deployment manager 103 determines a higher priority for the browser to load data for that UI component than UI components that are less frequently accessed. In some embodiments, the UI component includes invisible service code that is used to enhance the user's experience in interacting with the web page. In another embodiment, the deployment manager 103 also determines a priority for the browser to load UI components based on experimental running conditions.

In one embodiment, the deployment manager 103 collects user behavior data for a user in a social network, determines an order in which each UI component of a web page is loaded based at least in part on the user behavior data and instructs the browser to load the different UI components of the web page for the user according to the order. The deployment manager 103 is described in more detail below with reference to FIG. 2B.

The storage 105 may be a non-volatile memory device or similar persistent storage media for storing instructions and/or data for deferring the loading of UI components of a web page. For example, the storage 105 stores a set of scripts for loading a UI component. The storage 105 is communicatively coupled to the deployment manager 103.

The network 113 can be a conventional type, wired or wireless, and may have any number of configurations such as a star configuration, token ring configuration or other configurations known to those skilled in the art. Furthermore, the network 113 may comprise a local area network (LAN), a wide area network (WAN) (e.g., the Internet), and/or any other interconnected data path across which multiple devices may communicate. In yet another embodiment, the network 113 may be a peer-to-peer network. The network 113 may also be coupled to or includes portions of a telecommunications network for sending data in a variety of different communication protocols. In yet another embodiment, the network 113 includes Bluetooth communication networks or a cellular communications network for sending and receiving data such as via short messaging service (SMS), multimedia messaging service (MMS), hypertext transfer protocol (HTTP), direct data connection, WAP, email, etc.

Each user device 115a . . . 115n can be a computing device, for example, a laptop computer, a desktop computer, a tablet computer, a mobile telephone, a personal digital assistant (PDA), a mobile email device, a portable game player, a portable music player, a television with one or more processors embedded therein or coupled thereto or any other electronic device capable of accessing a network. In one embodiment, the system 100 comprises a combination of different types of user devices 115a . . . 115n.

The user device 115a is communicatively coupled to the network 113 via signal line 104a. The user 125a interacts with the user device 115a. The user device 115a comprises, among other things, a browser 117a. The user device 115n is communicatively coupled to the network 113 via signal line 104n. The user 125n interacts with the user device 115n. The user device 115n comprises, among other things, a browser 117n.

The browser 117a . . . 117n is code and routines stored in a memory of the user device 115a . . . 115n and executed by a processor of the user device 115a . . . 115n. A browser 117 of the user devices 115a . . . 115n loads a web page and presents the loaded web page to the users 125a . . . 125n. In one embodiment, the browser 117 presents a graphical user interface (GUI) to a user and allows the user to input information via the GUI.

Figure 2A:
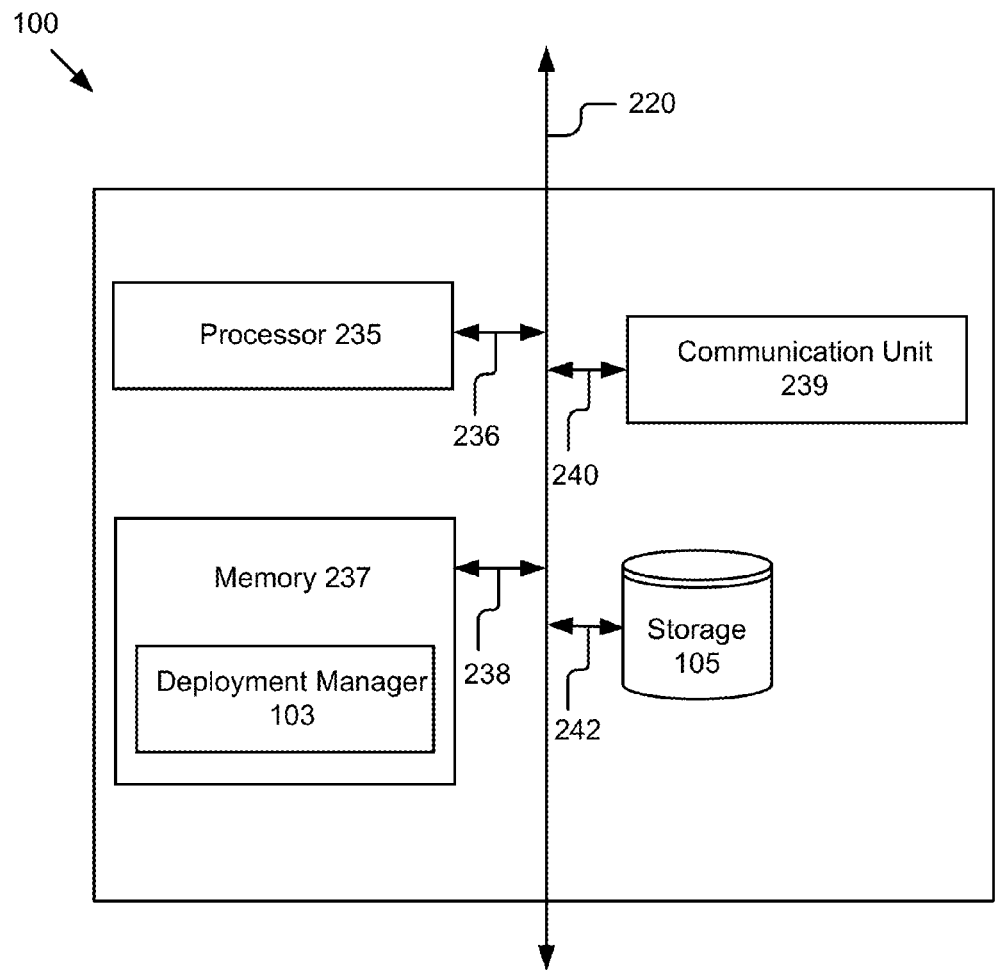
FIG. 2A is a block diagram illustrating one embodiment of hardware implementing the functionality of deferring the loading of components of a web page.

Referring now to FIG. 2A, example hardware implementing the functionality of deferring the loading of components of a web page is shown in more detail. FIG. 2A is a block diagram of a control server 101 that includes a processor 235, memory 237, storage 105, and a communication unit 239.

The processor 235 comprises some or all of an arithmetic logic unit, a microprocessor, a general purpose controller or some other processor array to perform computations and provide electronic display signals to a display device. The processor 235 is coupled to the bus 220 for communication with the other components via signal line 236. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2A, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 237 stores instructions and/or data that may be executed by processor 235. In one embodiment, the memory 237 includes the deployment manager 103. The memory 237 is coupled to the bus 220 for communication with the other components via signal line 238. The instructions and/or data may comprise code for performing any and/or all of the techniques described herein. The memory 237 may be a dynamic random access memory (DRAM) device, a static random access memory (SRAM) device, flash memory or some other memory device known in the art. In one embodiment, the memory 237 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 239 transmits and receives data to and from the control server 101. The communication unit 239 is coupled to the bus 220 via signal line 240. In one embodiment, the communication unit 239 includes a port for direct physical connection to the network 113 or to another communication channel. For example, the communication unit 239 includes a USB, SD, CAT-5 or similar port for wired communication with the user device 115. In another embodiment, the communication unit 239 includes a wireless transceiver for exchanging data with the user device 115 or any other communication channel using one or more wireless communication methods, such as IEEE 802.11, IEEE 802.16, BLUETOOTH® or another suitable wireless communication method.

In yet another embodiment, the communication unit 239 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 239 includes a wired port and a wireless transceiver. The communication unit 239 also provides other conventional connections to the network for distribution of files and/or media objects using standard network protocols such as TCP/IP, HTTP, HTTPS and SMTP as will be understood to those skilled in the art.

Example Deployment Managers

Figure 2B:
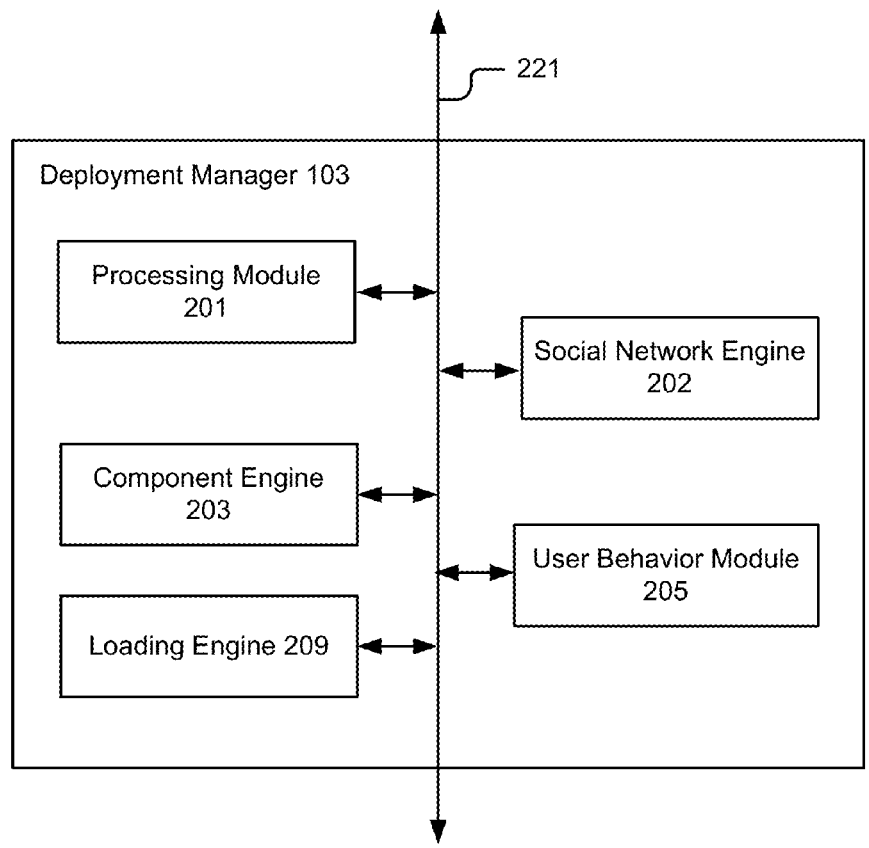
FIG. 2B is a block diagram illustrating one embodiment of a deployment manager.

Referring now to FIG. 2B, an example deployment manager 103 is shown in more detail. In one embodiment, the deployment manager 103 comprises a processing module 201, a social network engine 202, a component engine 203, a user behavior module 205 and a loading engine 209 that communicate over the software communication mechanism 221. Software communication mechanism 221 may be an object bus (such as CORBA), direct socket communication (such as TCP/IP sockets) among software modules, remote procedure calls, UDP broadcasts and receipts, HTTP connections, function or procedure calls, etc. Further, any or all of the communication could be secure (SSH, HTTPS, etc). The software communication can be implemented on any underlying hardware, such as a network, the Internet, a bus 220, a combination thereof, etc.

The processing module 201 includes hardware and/or software logic for receiving data describing user activities and generating user behavior data for a user in a social network based on the received data. In one embodiment, the processing module 201 is a set of instructions executable by the processor 235 to provide the functionality described below for generating the user behavior data. In another embodiment, the processing module 201 is stored in the memory 237 of the control server 101 and is accessible and executable by the processor 235. In either embodiment, the processing module 201 is adapted for cooperation and communication with the processor 235 and other components of the control server 101 via the software communication mechanism 221.

The processing module 201 receives user behavior data associated with a user interacting with a social network from the user device 115. The user behavior data includes, for example, the length of time that a user is present for each session of interacting with a social network application, the items on the web page that the user selected or hovered over, search terms, sharing, rating and other types of interactions in the social network. For example, the processing module 201 processes user behavior data on searching that includes a number of searches sent by a user for displaying an image, a number of images received by the user in response to searching for an image and a number of selections made by the user in response to receiving the images. In another embodiment, the user behavior data includes user preferences determined based at least in part on different types of interactions. For example, the processing module 201 generates user behavior data including user interests, preferred languages, etc.

In one embodiment, the processing module 201 processes user behavior data that includes information about how a user accesses a web page. In particular, the user behavior data includes a frequency of a user interacting with each user interface (UI) component of a web page. The UI component of the web page includes, for example, text or an icon on the web page, and will be described in more detail below with reference to the component engine 203. For example, the processing module 201 processes user behavior data indicating that, when a user accesses an electronic messaging web page, the user frequently selects an inbox icon to check incoming emails and rarely selects a setting icon to change the configuration of the electronic messaging web page.

In one embodiment, the processing module 201 receives data from user inputs and actions across a range of data sources (e.g., web search data, social activity data, etc.) and organizes the received data to generate user behavior data associated with a user. For example, the processing module 201 collects navigational information from a user's browser history, identifies a set of navigational information that describes a user accessing a web page, summarizes the set of navigational information such as counting the times the user selected a UI component of the web page and computes a frequency of the user selecting the UI component.

In another embodiment, the processing module 201 extracts features from the user behavior data to process metrics associated with the user behavior data. For example, the processing module 201 receives information about how long a user's mouse was positioned over a link. The processing module 201 compares the time that the mouse was positioned over the link to a threshold period of time. Regardless of a user selecting the link or not, a time positioned over the link greater than the threshold period of time suggests that the user was interested in the link. The processing module 201 determines that the user prefers this link rather than other links and generates the user behavior data to reflect this preference. Similarly, if the user's mouse frequently hovers over a region within a predefined proximity of a link, for example, at a frequency higher than a predetermined frequency, the processing module 201 determines that the link is interesting to the user and takes this interest into account when processing the metrics of the user behavior data.

In one embodiment, the processing module 201 sends the user behavior data to the user behavior module 205. In another embodiment, the processing module 201 stores the user behavior data on the storage 105.

The social network engine 202 includes hardware and/or software logic for generating a social network, registering users and managing interactions in the social network.

In one embodiment, the social network engine 202 is a set of instructions executable by the processor 235 to provide the functionality described below for managing the social network. In another embodiment, the social network engine 202 is stored in the memory 237 of the control server 101 and is accessible and executable by the processor 235

The term social network as used herein encompasses its plain and ordinary meaning, including, but not limited to various types of social structures where the users are connected by a common feature. The common feature includes friendship, family, work, an interest, etc. The common features are provided by the social network, for example, explicitly-defined relationships and relationships implied by social connections with other users, where the relationships are defined in a social graph. The social graph is a mapping of users in a social network and how they are related to each other. In one embodiment, the social network engine 202 is stored on a separate server than the deployment manager 103.

The social network engine 202 receives information for registering the user, generates a user profile and maintains user relationships with the social graph. The social network engine 202 generates a social network where users post content, images, comment, share content, videos, etc. In another embodiment, the social network engine 202 generates a messaging environment where users communicate electronically with each other and are connected through their messaging contacts. The social network engine 202 instructs the component engine 203 to generate the graphical images and code for displaying the social network once it is rendered by the browser 117 on the user device 115.

The component engine 203 includes hardware and/or software logic for generating the graphical data for displaying the web page and instructions for loading different UI components of a web page. In one embodiment, the component engine 203 is a set of instructions executable by the processor 235 to provide the functionality described below for generating the graphical data for displaying the web page and instructions for loading the different UI components of the web page. In another embodiment, the component engine 203 is stored in the memory 237 of the control server 101 and is accessible and executable by the processor 235. In either embodiment, the component engine 203 is adapted for cooperation and communication with the processor 235 and other components of the control server 101 via the software communication mechanism 221.

The phrase "UI component" as used herein encompasses its plain and ordinary meaning including, but not limited to, an element that is part of a web page. In one embodiment, the UI component includes a visual element of the web page such as a word, an icon, an image, a link, a title, text, etc. In another embodiment, the UI component includes an element that is visually imperceptible to a user. For example, the UI component is a pixel on a blank page that is used as a background of a web page. In one embodiment, a UI component is used to cover a specific application need. For example, a UI component of a web page is used to publish a chart on the web page.

In one embodiment, the component engine 203 receives instructions to generate graphical data for displaying a web page from the social network engine 202 and generates a set of scripts for loading the UI components of a web page. Each UI component is associated with at least one independent script. For example, the component engine 203 generates a first script of static content (e.g., an HTML script) for loading a basic outline of a web page such as a title, a menu, etc. and generates a second script of active content (e.g., a JavaScript application) for loading a dynamic UI component such as a counter that indicates the number of people that visited the web page by the loading time.

In one embodiment, the component engine 203 generates static content that includes static images and deferred JavaScript files so that the same file can be served at a given time to a large number of users of a category without customizing the physical content for each request. For example, the component engine 203 generates a deferred JavaScript file that is composed of modules, each of which can be enabled or disabled, and which can be initialized with data that can be variable for each base page rendering. Data for initializing a module, or enabling or disabling a module, is rendered on the base page as part of inline JavaScript on the base HTML page. The content can be varied for each base page rendering.

The component engine 203 also organizes the inline JavaScript into modules that can be related one-to-one with modules in the deferred JavaScript file. The rendering of the inline JavaScript can be configured to include various combinations of inline modules according to the need of the module's functionality for the user's content for which it is being delivered. Inline JavaScript modules associated to deferred modules that they depend on for implementation support. So the selection of inline JavaScript modules to include in a given rendering helps determine what deferred JavaScript files containing the deferred modules are to be loaded to support the page.

In some embodiments, the component engine 203 generates inline content in a way that can be integrated into a wide variety of services provided by the component engine 203. The component engine 203 generates inline components as a set of pre-rendered content pieces that are embedded into the web page output stream. In another embodiment, the component engine 203 generates reusable templates for the content pieces and receives content from the social network engine 202 to fill the templates and embeds the results in the web page output stream.

The component engine 203 is configured to integrate into a wide variety of host frontends in a way that prevents interference with the primary functionality of the host frontend. For instance, host frontends may have their own set of deferred content, for example images and JavaScript, fetched separately. One goal is therefore to avoid competing for browser resources, such as network connections and JavaScript execution load. This is accomplished by waiting before the deferred JavaScript is loaded.

The component engine 203 generates parameters for loading the UI components of the web page. For example, the component engine 203 generates parameters for different functions that are embedded in a set of scripts for loading different UI components. In yet another embodiment, the component engine 203 generates other data structures for loading the UI components of the web page. For example, the component engine 203 generates a data package as a placeholder to include every script that will be loaded and executed at a deferred time.

In one embodiment, the component engine 203 stores the data for loading the UI components of a web page on the storage 105. In another embodiment, the component engine 203 transmits the data for loading the UI components of the web page to the loading engine 209. In yet another embodiment, the component engine 203 receives a call for updating a UI component of the web page and transmits the updated data associated with the UI component of the web page to the loading engine 209.

The user behavior module 205 includes hardware and/or software logic for receiving user behavior data associated with the social network and for determining an order in which each UI component of a web page is loaded. In one embodiment, the user behavior module 205 is a set of instructions executable by the processor 235 to provide the functionality described below for determining the order in which each UI component is loaded. In another embodiment, the user behavior module 205 is stored in the memory 237 of the control server 101 and is accessible and executable by the processor 235. In either embodiment, the user behavior module 205 is adapted for cooperation and communication with the processor 235 and other components of the control server 101 via the software communication mechanism 221.

The user behavior module 205 determines an order for loading each UI component of a web page. When different UI components are loaded at different times according to the order determined for a user, the potential loading latency caused by simultaneous loading of an entire web page is reduced and this improves the user's website experience. In addition, the user behavior module 205 determines a user-specific loading order for each user who requests the loading of a web page.

In one embodiment, the user behavior module 205 receives user behavior data associated with a user from the user device 115 via the processing module 201 and determines an order in which each UI component of a web page is loaded based at least in part on the user behavior data. The user behavior data associated with the user includes at least a frequency that the user interacts with each UI component of the web page. In one embodiment, the user behavior module 205 determines a high priority for loading a UI component if the user behavior module 205 receives a high frequency of the user interacting with the UI component. Thus if the user behavior module 205 receives a higher frequency of a user interacting with a first UI component than a second UI component, the user behavior module 205 determines an order for loading the first UI component before the second UI component. For example, when a user requests that the browser 117 running on a user device 115 load a messaging web page, the user behavior module 205 determines an order that allows a number of electronic messages (e.g. emails) to be loaded on the web page before a contact list. The user frequently clicks on the number to check incoming emails. On the other hand, the user knows who may be on his or her contact list and therefore seldom checks the contact list.

The user behavior module 205 uses the user behavior data associated with a user to determine a user-specific order. This personalized order allows each UI component of a web page to be personalized for each user. The identity of the user is determined before the user behavior module 205 determines the order for displaying the UI components. The identity is determined in a variety of ways, including through user logins and cookies.

The user behavior module 205 takes into account attributes other than the frequency information in the user behavior data to determine the order for loading the UI components of a web page. For example, the user behavior module 205 determines that images and text in Chinese should be loaded before English components when loading a user profile page for a user in a social network because the user behavior data associated with the user indicates that the user's native language is Chinese.

In another embodiment, the user behavior module 205 also determines a priority for loading a UI component based on experimental running conditions. For example, the social network engine 202 introduces a new feature in the social network, such as a banner or a widget. The user behavior module 205 gives priority to loading the new feature to make it readily available to the users in order to collect metrics about the new feature. In some embodiments, the user behavior module 205 predicts which kinds of users will find a new feature interesting and the new feature is only disclosed to those users. For example, a new calendar widget appears on the web page of users that frequently use a separate calendar program associated with the social network.

In one embodiment, the user behavior module 205 determines an order for first loading a static version of a web page and then loading other UI components of the web page. A static version of a web page serves a minimal amount of static data of the web page and is presented to a user exactly as it is stored. For example, a static version of a user profile page for a user in a social network includes unchanging UI components such as a menu bar, a navigation bar, standard text and other components formatted using a template. In one embodiment, the static version of the web page also includes personal data of a user such as the user's name, photo, welcome messages specific for the user, etc. When a user requests the loading of a web page, the user behavior module 205 instructs the browser 117 to first load a static version of the web page because this minimal amount of static data can be loaded with the least latency in terms of avoiding network overload. The user behavior module 205 then determines the order for loading other UI components of the web page based at least in part on user behavior data associated with the user as described above.

The loading engine 209 includes hardware and/or software logic for loading different UI components of a web page for a user. In one embodiment, the loading engine 209 is a set of instructions executable by the processor 235 to provide the functionality described below for loading the UI components of the web page for the user. In another embodiment, the loading engine 209 is stored in the memory 237 of the control server 101 and is accessible and executable by the processor 235. In either embodiment, the loading engine 209 is adapted for cooperation and communication with the processor 235 and other components of the control server 101 via the software communication mechanism 221.

In one embodiment, the loading engine 209 transmits data to a user's browser 117 for loading a static version of a web page and then for loading different UI components of the web page. The loading engine 209 identifies a user who requests the loading of a web page and transmits a static version of the web page for caching to the user's browser. For example, when generating a user profile page for a user in a social network, the loading engine 209 first transmits data for displaying an outline of the user profile page and user's personal data such as a name for the user. The loading engine 209 also prepopulates and transmits data associated with different UI components of the web page. In one embodiment, the loading engine 209 prepopulates data saved or cached from a previous loading of the web page. For example, the loading engine 209 prepopulates and transmits data for displaying a notification component on a user's profile page. The notification component contains a number that indicates how many notifications the user had in the previous loading of the user profile page.

Once the loading engine 209 transmits data for loading the static version of the web page and the prepopulated data, the loading engine 209 transmits the UI components of the web page. In one embodiment, the loading engine 209 transmits the UI components of the web page in response to receiving a first call from a user's browser. The first call is a communication message (e.g., a ping command) automatically generated by the browser at a predetermined time interval. The first call from the browser triggers the user behavior module 205 to retrieve user behavior data associated with the user and determine an order to load the UI components of the web page based at least in part on the user behavior data. The loading engine 209 receives the order from the user behavior module 205, retrieves data for loading UI components of the web page from the component engine 203 and determines to load a first UI component before a second UI component. In some embodiments, if the loading engine 209 receives an order indicating that the priority for loading a first UI component of a web page is higher than loading a second UI component of the web page, the loading engine 209 transmits data for loading the first UI component before transmitting data for loading the second UI component. As a result, the browser loads the first UI component before the second UI component for the user. For example, in response to receiving a call from a user's browser, the loading engine 209 transmits data for displaying a notification component that indicates a current number of notifications for the user before transmitting data for displaying a UI component indicating a title change of the web page because the user accesses the notification component more frequently than the title change.

In one embodiment, the loading engine 209 updates a UI component of the web page in response to receiving a second call initiated by the user. The second call is received responsive to a user action such as a mouse hover-over, a button clicking, etc. The second call initiated by the user triggers the component engine 203 to generate updated data for loading a UI component. The loading engine 209 retrieves the updated data associated with the UI component and transmits the updated data for displaying the updated UI component to the user. For example, a user hovers over a notification component of a user profile page and sends out a second call to notify updating the notification component. The notification component indicates a number of notifications that the user has. Responsive to receiving the second call, the loading engine 209 transmits the updated data associated with the notification component to display the updated number of notifications for the user. In another embodiment, the loading engine 209 also transmits updated data associated with a UI component based at least in part on experimental running conditions.

In one embodiment, the loading engine 209 instructs the user's browser to store the updated data associated with a UI component as prepopulated data. When the web page is next loaded for the user, the loading engine 209 may first prepopulate the stored data for the UI component.

Example User Interfaces

Figure 3:
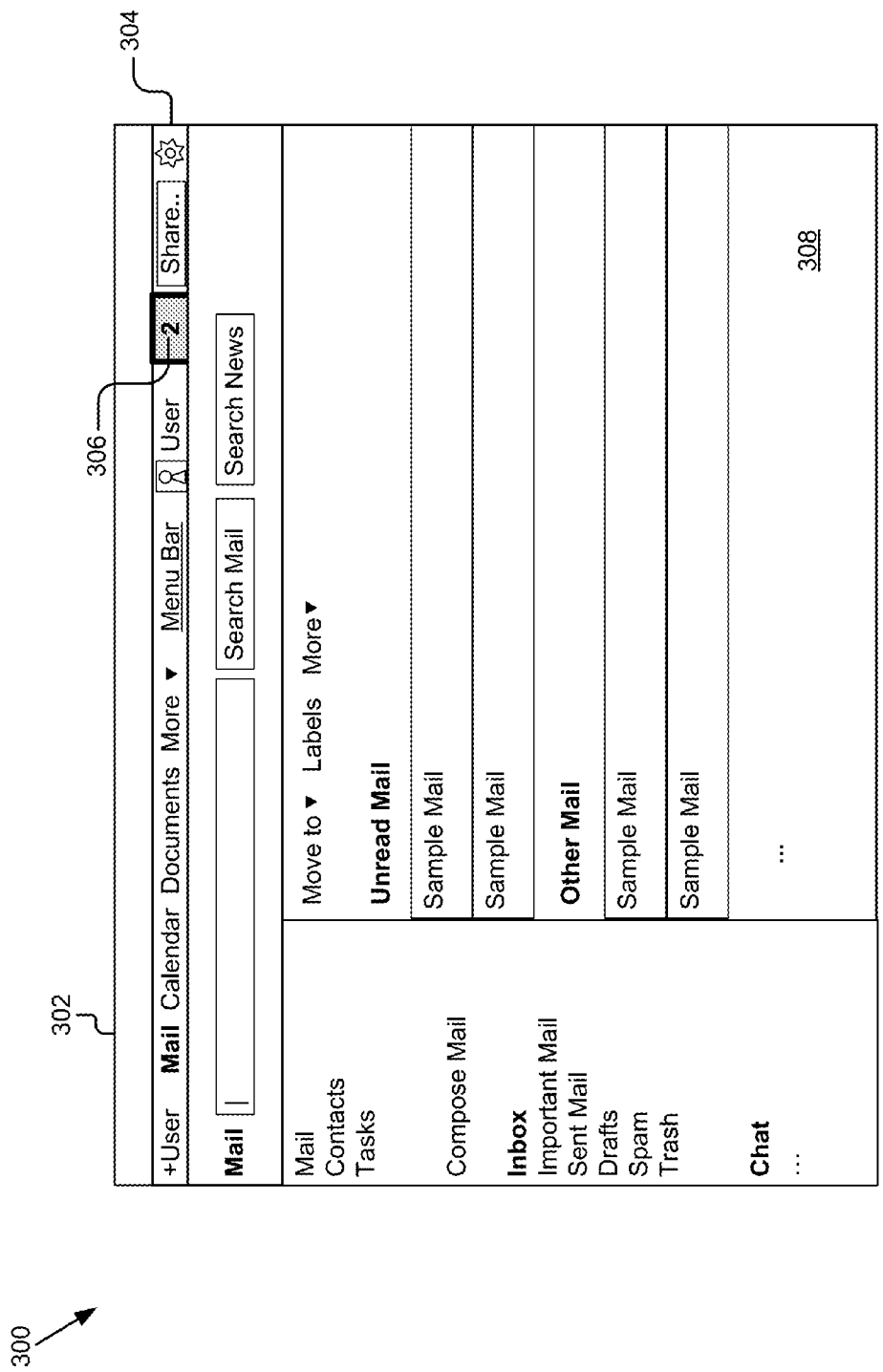
FIG. 3 is a graphic representation of a user interface for presenting UI components of a web page at a deferred time according to one embodiment.

Referring now to FIG. 3, one example of a graphic representation of a user interface 300 for presenting UI components of a web page at a deferred time according to one embodiment is described. The user interface 300 includes a window 302 having a number of UI components including a menu bar 304, a notification component 306 and a display area 308. The user interface 300 presents an email page for a user in a social network. When the messaging web page is loaded for the user, the menu bar 304 and the display area 308 are first loaded and displayed to the user. In the meantime, the notification component 306 is prepopulated and transmitted from stored prepopulated data. The prepopulated data is stored in the browser cache as a previous loading of the messaging web page. For example, a number 3 in the notification component 306 indicates that there were three unread notifications when the messaging web page was loaded for the user the last time (not shown). A call repeatedly and automatically generated from the user's browser notifies the loading of the notification component 306 after the loading of prepopulated data. Responsive to receiving the call, a number "2" in the notification component 306 indicates that there are two unread notifications for the user when the user currently requests the email page. The deferred loading of the notification component 306 is useful to reduce an overall loading latency.

Example Methods

Figure 4A:
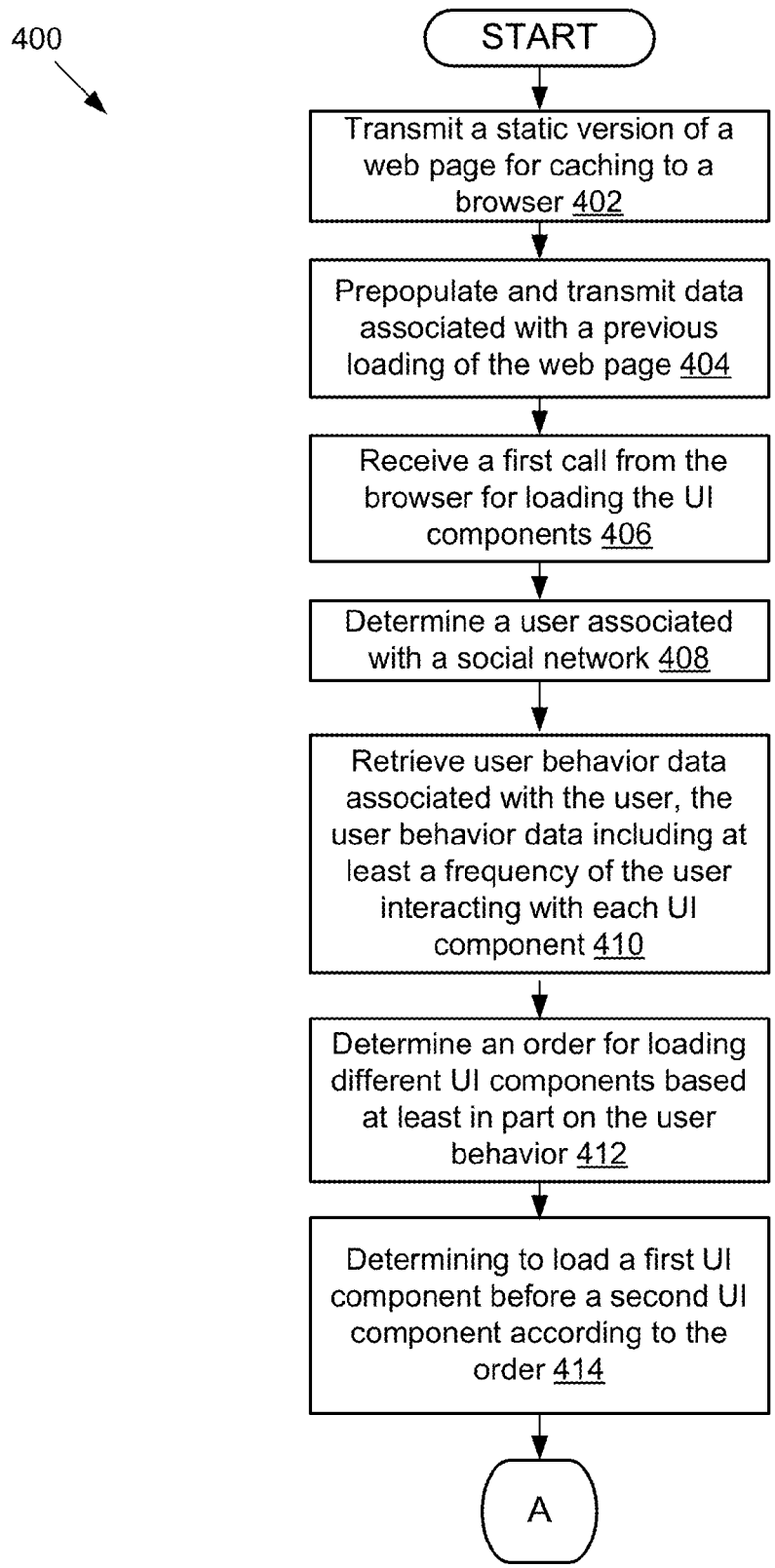
FIGS. 4A and 4B are flow diagrams of one embodiment of a method for deferring the loading of components of a web page.
Figure 4B:
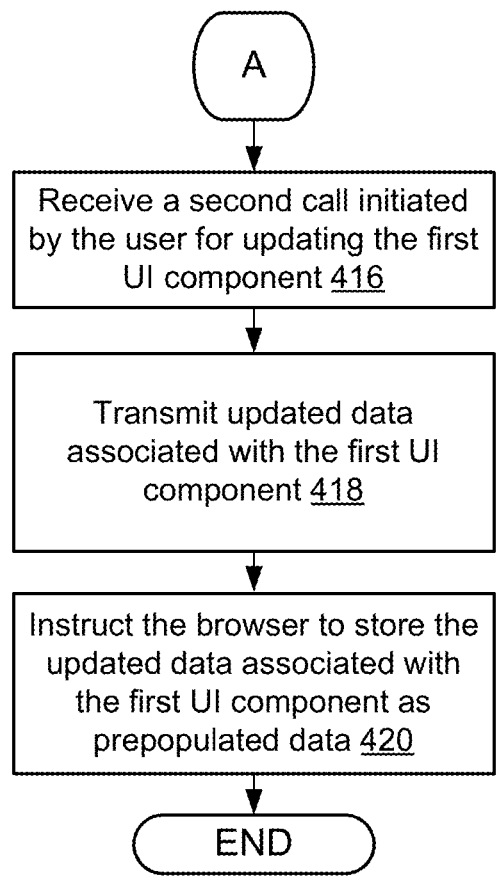

FIGS. 4A and 4B are flow diagrams that illustrate one embodiment of the methods for deferring the loading of UI components of a web page. Referring now to FIG. 4A, a deployment manager 103 includes a processing module 201, a social network engine 202, a component engine 203, a user behavior module 205 and a loading engine 209. The loading engine 209 transmits 402 a static version of the web page associated with a social network for caching to a browser 117 on a user device 115. For example, when generating a user profile page for a user in a social network, the loading engine 209 first transmits data such as a menu, a title and user's personal data (e.g., a name) to the browser 117. The social network was generated by the social network engine 202. The loading engine 209 prepopulates and transmits 404 data associated with a previous loading of the webpage. For example, the browser 117 accesses a cached snapshot for displaying a notification component on a user's profile page from the last time the user visited the web page.

The loading engine 209 receives 406 a first call from the browser 117 for loading the UI components. The first call can be a communication message (e.g., a ping command) automatically generated by the browser at a predetermined time interval. The loading engine 209 determines 408 a user associated with the social network. In one embodiment, the loading engine 209 performs the determining step based on the first call from the browser. In another embodiment, the loading engine 209 performs the determining step independent of the browser call.

The user behavior module 205 retrieves 410 user behavior data associated with the user from the processing module 201. The user behavior data includes at least a frequency of the user interacting with each UI component of the web page. The user behavior module 205 determines 412 an order for loading different UI components of the web page based at least in part on the user behavior, such as frequency. For example, when the user behavior module 205 receives a higher frequency of a user interacting with a first UI component than a second UI component, the user behavior module 205 determines that the priority for loading the first UI component is higher than the priority for loading the second UI component. In one embodiment, the order is further modified based on the experimental running condition of a component. For example, if the social network engine 202 is testing out a new feature, the new feature is loaded before other features because the administrator of the social network wants to maximize the amount of time that the new feature is present on the web page.

The browser 117 determines 414 to load the first UI component before the second UI component according to the order. In one embodiment, the component engine 203 generates the data for loading the first UI component. The data includes at least scripts, parameters and other data structures used for loading the first UI component of the web page.

Referring now to FIG. 4B, the loading engine 209 receives 416 a second call initiated by the user from the processing module 201 for updating the first UI component. The second call is received responsive to a user action such as a mouse hover-over, a button clicking, etc. The loading engine 209 transmits 418 the updated data associated with the first UI component. The loading engine 209 instructs 420 the browser to store the updated data associated with the first UI component as prepopulated data. When the web page including the UI component is loaded the next time, the browser 117 retrieves the prepopulated data from the cache.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

What is claimed is:

1. A computer-implemented method for determining loading of web pages, the method comprising:
   receiving, using one or more computing devices, a first call from a browser for loading a first user interface component, a second user interface component and a third user interface component of a web page, the third user interface component being a new feature associated with the web page;
   determining, using the one or more computing devices, a user in a social network based on the first call from the browser;
   receiving, using the one or more computing devices, user behavior data associated with the user interacting with a social network application, the user behavior data including at least one of a frequency of the user interacting with each user interface component and a time length of the user being present for each session of interacting with the social network application;
   determining, using the one or more computing devices, a higher priority for loading the first user interface component than the second user interface component based at least in part on the received user behavior data associated with the user;
   determining, using the one or more computing devices, a highest priority for loading the third user interface component based on the third user interface component being the new feature; and
   displaying the first, second and third user interface components in a same user interface to the user responsive to loading the first, second and third user interface components with corresponding priorities.

2. The method of claim 1, further comprising:
   transmitting a static version of the web page; and
   prepopulating and transmitting data associated with a previous version of the web page before loading the first, second and third user interface components of the web page.

3. The method of claim 1, further comprising:
   receiving a second call initiated by the user for updating the first user interface component;
   transmitting updated data associated with the first user interface component; and
   instructing the browser to store the updated data as prepopulated data.

4. The method of claim 3, wherein the second call is received responsive to at least one of a hover-over and a button clicking of a mouse on the web page.

5. The method of claim 1, further comprising identifying user interests for the user in the social network from the user behavior data.

6. The method of claim 1, wherein the second user interface component is visually imperceptible to the user.

7. The method of claim 1, further comprising identifying a language that the user prefers from the user behavior data.

8. The method of claim 1, wherein determining the higher priority is based at least in part on the frequency.

9. The method of claim 1, wherein the first call includes a communication message automatically generated by the browser at a predetermined time interval.

10. A system for determining loading of web pages, the system comprising:
    one or more processors, the one or more processors being configured to:
    receive a first call from a browser for loading a first user interface component, a second user interface component and a third user interface component of a web page, the third user interface component being a new feature associated with the web page;
    determine a user in a social network based on the first call from the browser;
    receive user behavior data associated with the user interacting with a social network application, the user behavior data including at least one of a frequency of the user interacting with each user interface component and a time length of the user being present for each session of interacting with the social network application;
    determine a higher priority for loading the first user interface component than the second user interface component based at least in part on the received user behavior data associated with the user;
    determine a highest priority for loading the third user interface component based on the third user interface component being the new feature; and
    display the first, second and third user interface components in a same user interface to the user responsive to loading the first, second and third user interface components with corresponding priorities.

11. The system of claim 10, wherein the one or more processors are further configured to:
    transmit a static version of the web page; and
    prepopulate and transmit a previous version of the web page before loading the first, second and third user interface components of the web page.

12. The system of claim 10, wherein the one or more processors are further configured to:
    receive a second call initiated by the user for updating the first user interface component;
    transmit updated data associated with the first user interface component; and
    instruct the browser to store the updated data as prepopulated data.

13. The system of claim 12, wherein the second call is received responsive to at least one of a hover-over and a button clicking of a mouse on the web page.

14. The system of claim 10, wherein the one or more processors are further configured to identify user interests for the user in the social network from the user behavior data.

15. The system of claim 10, wherein the one or more processors are further configured to identify a language that the user prefers from the user behavior data.

16. A computer program product comprising a non-transitory computer usable medium including a computer readable program, wherein the computer readable program when executed on a computer causes the computer to:
    receive a first call from a browser for loading a first user interface component, a second user interface component and a third user interface component of a web page, the third user interface component being a new feature associated with the web page;
    determine a user in a social network based on the first call from the browser;
    receive user behavior data associated with the user interacting with a social network application, the user behavior data including at least one of a frequency of the user interacting with each user interface component and a time length of the user being present for each session of interacting with the social network application;
    determine a higher priority for loading the first user interface component than the second user interface component based at least in part on the received user behavior data associated with the user;

determine a highest priority for loading the third user interface component based on the third user interface component being the new feature; and display the first, second and third user interface components in a same user interface to the user responsive to loading the first, second and third user interface components with corresponding priorities.

17. The computer program product of claim 16, wherein the computer readable program when executed on the computer further causes the computer to:

transmit a static version of the web page; and prepopulate and transmit data associated with a previous version of the web page before loading the first, second and third user interface components of the web page.

18. The computer program product of claim 16, wherein the computer readable program when executed on the computer further causes the computer to:

receive a second call initiated by the user for updating the first user interface component;

transmit updated data associated with the first user interface component; and instruct the browser to store the updated data as prepopulated data.

19. The computer program product of claim 18, wherein the second call is received responsive to at least one of a hover-over and a button clicking of a mouse on the web page.

20. The computer program product of claim 16, wherein the computer readable program when executed on the computer further causes the computer to identify user interests for the user in the social network from the user behavior data.

\* \* \* \* \*